June 4, 1963    A. S. CORSON ETAL    3,091,962
ANGLE OF ATTACK COMPUTER
Filed Dec. 29, 1959
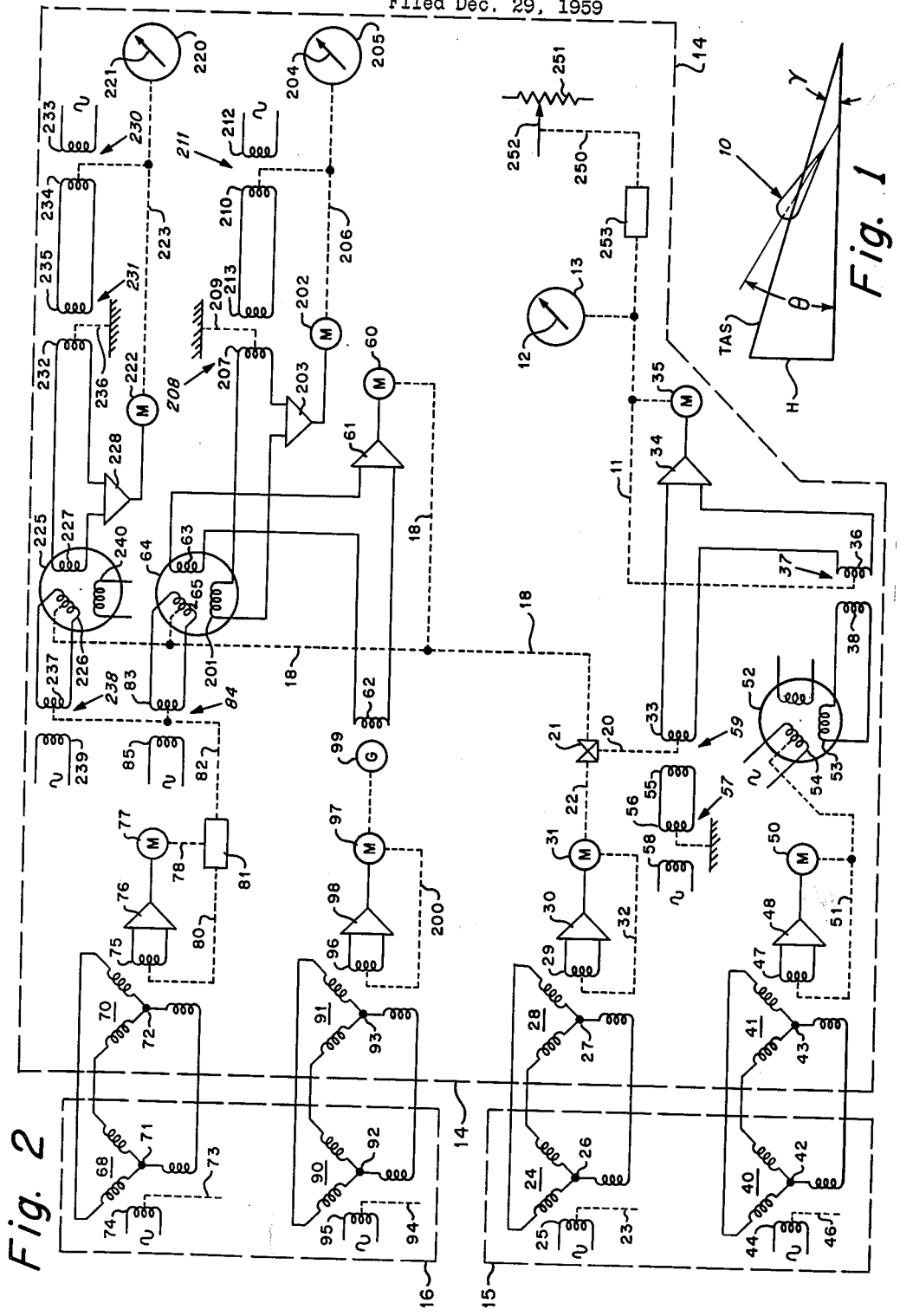

ANGLE OF ATTACK COMPUTER

Alan S. Corson, Levittown, Cyrus Beck, Abington, and Louis S. Guarino, Hatboro, Pa.; said Corson and said Guarino assignors to the United States of America as represented by the Secretary of the Navy
Filed Dec. 29, 1959, Ser. No. 862,724
13 Claims. (Cl. 73—178)
(Granted under Title 35, U.S. Code (1952), sec. 266)

The invention described herein may be manufactured and used by or for the Government of the United States of America for governmental purposes without the payment of any royalties thereon or therefor.

The present invention relates to means for generating a shaft rotation proportional to the angle of attack of an aircraft, and more particularly relates to means for computing the angle of attack of an aircraft.

Heretofore, the angle of attack of an aircraft has been principally measured by means of an external probe or vane protruding into the airstream of the aircraft. Usually the probe or vane is adapted to drive a potentiometer or synchro for purposes of computation or indication of the angle of attack. This method has many disadvantages including measuring a local angle of attack rather than the true angle of attack of the aircraft, of disturbing air flow and creating turbulence and drag, of being limited in accuracy to about one degree, and of being subject to freezing at high altitudes.

It is contemplated that the invention will eliminate the above disadvantages, and more particularly will have the advantages of being self-contained and having no external probes or vanes to create turbulence or drag, providing the aircraft angle of attack relative to aircraft coordinates having an accuracy limited only by the input data, of having an achievable accuracy of 0.25 degree or better, and of not being affected by external environmental conditions. Accordingly, the invention provides the accompanying advantages, due to increased accuracy, of being useful to obtain increased accuracy in fire control equipment and of permitting the use thereof with any additional required functions by the addition of transducers on the output shaft having a rotation proportional to the aircraft's angle of attack relative to aircraft coordinates.

Yet another advantage of the invention is that the true angle of attack computation is not based on the use of ram and static pressures together with the acceleration of the aircraft in the direction of its yaw axis.

A principal object of the invention, therefore, is the provision of a novel angle of attack computer having the advantages set forth hereinabove.

Another object of the invention is the provision of a novel angle of attack analog computer utilizing inputs comprising roll and pitch from a gyro platform, fine altitude, and true air speed.

A still further object of the invention is the provision of an analog computer as set forth in the preceding object wherein the vertical speed is provided by a tachometer follow-up of sensed altitude change.

A still further object of the invention is the provision of an analog computer, as set forth in the above objects, capable of computing the angle of attack relative to aircraft coordinates, true vertical speed, and/or true horizontal speed.

A still further object is the provision of an improved angle of attack analog computer capable of providing a shaft rotation proportional to the aircraft's angle of attack relative to aircraft coordinates which is capable of being made accurate to within 0.25 degree.

The invention further resides in certain novel features of construction, combinations and arrangements of parts and further objects and advantages of the invention will be apparent to those skilled in the art to which it pertains from the following description of the present preferred embodiment thereof described with reference to the accompanying drawing, which forms a part of this specification, and wherein the same reference characters represent corresponding parts throughout the several views, and in which:

FIG. 1 is a geometric diagram illustrating the angles involved in computing the angle of attack of an aircraft; and FIG. 2 is a schematic diagram of the electromechanical apparatus embodying the invention.

It is to be understood that the invention is not limited to the details of construction and arrangement of parts shown in the drawing and hereinafter described in detail, but is capable of being otherwise embodied and of being carried out in various ways.

Referring to FIG. 1, an airfoil such as a wing of the aircraft is indicated generally by the reference numeral 10. The actual pitch angle of the wing 10 is indicated as an angle $\theta$, and the flight path angle of the aircraft is indicated as an angle $\gamma$ which is illustrated as being the arc sine of true air speed or slant speed TAS of the aircraft divided by true vertical speed H. This is illustrated in the followng equation:

(1) $$\gamma = \sin^{-1} \frac{H}{TAS}$$

where $\gamma$=flight path angle,
H=vertical speed, and
TAS=slant speed.

Since angle of attack relative to the earth may be different from the angle of attack relative to line of flight, it is apparent from FIG. 1 that:

(2) $$\alpha_E = \theta - \gamma$$

where $\alpha_E$=angle of attack (earth coordinates), and
$\theta$=pitch angle of the aircraft.

By substitution:

(3) $$\alpha = \alpha_E / \cos \phi$$

where $\alpha$=angle of attack (aircraft coordinates), and
$\phi$=aircraft bank angle.

Referring to FIG. 2, a shaft 11 is adapted to be rotated to a position proportional to the angle of attack relative to aircraft coordinates of the aircraft and drive a pointer 12 in an angle of attack indicator 13 for directly indicating the angle of attack of the aircraft relative to aircraft cordinates. The shaft 11 is driven by motor 35 of an analog computer 14 having the inputs comprising electrical roll and pitch signals respectively representative of roll and pitch of the aircraft from a gyro platform 15, and true air speed and fine altitude from an air data computer 16, and a tachometric follow-up of sensed altitude change provides an electrical signal proportional to rate of change of altitude H.

More particularly, Equation (1) is solved for flight path angle $\gamma$ by the use of the inputs from the air data computer 16. Flight path angle $\gamma$ is indicated by the rotation of a shaft 18.

Equation (2) is solved for earth angle of attack $\alpha_E$ and indicated by the rotation of a shaft 20 by means of a mechanical differential 21 driven by the shaft 18 and a shaft 22 which is rotated proportional to the pitch angle of the aircraft.

The pitch angle $\theta$ is obtained from the gyro platform 15 by means of a signal imposed on a rotor shaft 23 of a transmitter synchro 24 having an input coil 25 energized by a rated electrical supply. The transmitter has a Y-shaped stator winding 26 connected back-to-back with a Y-shaped primary winding 27 of a control transformer 28. A secondary 29 of the transformer 28 supplies the pitch change signal from the transmitter 24 to an amplifier 30. The output of the amplifier 30 drives a synchro motor 31 which drives the θ shaft 22. The motor 31 nulls the input to the amplifier 30 by means of a rotor shaft 32.

Assuming that there is no roll angle change by the aircraft, the earth angle of attack is equal to α cos φ as stated in Equation (3) and the electrical signal in a closed servo loop feeding to an amplifier 34 is proportional to the signal transmitted by a coil 33 driven by the shaft 20. The amplifier 34 drives a synchro motor 35 which positions the shaft 11 according to the computed angle of attack relative to aircraft coordinates.

The motor 35 is nulled by the adjustment by the shaft 11 of a rotor coil or secondary winding 36 of a linear transformer 37 having an input or primary winding 38. The winding 38 is adapted to have an electrical signal induced therein proportional to the cosine of the aircraft's roll angle sensed by an aircraft's roll sensing gyroscope in the gyro platform 15.

The aircraft's roll angle sensed by the roll gyro, not shown, is transmitted via synchro system similar to the pitch synchro system comprised of the transmitter 24 and the control transformer 28. The roll synchro system is comprised of a transmitter 40 and a control transformer 41 respectively having a Y-shaped stator winding 42, 43, the windings 42 and 43 being connected back-to-back. A primary winding 44 of the transmitter 40 is adapted to be angularly adjusted by a rotor shaft 46 according to the roll angle and the electrical signal therein is transmitted to a secondary winding 47 of the control transformer 41, which feeds the signal to the input side of an amplifier 48. The output of the amplifier 48 drives a synchro motor 50 and the motor 50 angularly positions a shaft 51 according to the roll angle φ. The shaft 51 nulls the input to the amplifier by repositioning the secondary winding 47 to a null position.

The cos φ signal is supplied to the winding 38 of the transformer 37 from a control synchro or cosine resolver 52 by means of a cosine pickoff coil 53. The resolver 52 is provided with a hypotenuse rotor coil 54 positioned by the shaft 51. The coil 53 picks off a signal proportional to the cosine of roll angle φ as is understood in the art.

Referring to the transformer 37, the pickoff or rotor coil 36 picks off a signal proportional to α cos φ, since signal in the coil 38 is proportional to the cos φ and the rotor shaft is positioned proportional to the aircraft angle of attack α. Accordingly, the signal induced into the winding 36 is the product of the two signals.

Since the windings 33 and 36 are in series and oppositely wound, the output of the amplifier 34 is not nulled until the shaft 11 is angularly positioned according to the computed value of the angle of attack α in accordance with Equation (3).

The secondary or rotor coil 33 driven by the shaft 20 forms a part of a linear transformer 59 having a stationary primary winding 55 energized from a standard power source. For calibration purposes, the winding 55 is connected back-to-back with an adjustable secondary winding 56 of a control synchro 57. A manually adjustable rotor adjusts the secondary 56 relative to a stationary input or primary winding 58 energized from the standard electrical power supply.

The instantaneous value of the true flight path angle γ is signalled by the rotation of the shaft 18, which is driven by a synchro motor 60 connected to the output of an amplifier 61. The amplifier 61 is connected in a closed servo loop having series-connected but oppositely wound coils 62 and 63 therein. The coil 62 is adapted to have an electrical signal proportional to the vertical speed H induced therein. The coil 63 is adapted to have an electrical signal, of opposite polarity, proportional to TAS sin γ induced therein, Equation (1).

When the signals in the coils 62 and 63 are equal, the amplifier 61 will be nulled. If the amplifier 61 is not nulled, the motor 60 will drive the γ shaft 18 to a position to vary the value of TAS sin γ in the form of an electrical signal in the coil 63 until the output of the amplifier 61 is nulled. The coil 63 is a sine coil of a resolver 64 having an input rotor coil 65 driven by the γ shaft 18. An electrical signal proportional to true air speed TAS is supplied to the input rotor coil 65 from the air data computer 16.

More particularly, a synchro system comprised of a transmitter 68 in the air data computer 16 and a control transformer 70 in the computer 14 each have a Y-shaped stator winding 71, 72, respectively, connected back-to-back.

The magnitude of true air speed TAS is supplied from a central computer such as the air data computer 16 and is converted to shaft rotation, for example, via rotor shaft 73 and drives an input winding 74. The winding is energized from a rated standard electrical power supply. The winding 74 transmits an electrical signal to the secondary 71 proportional to the true air speed TAS.

A secondary winding 75 of the control transformer 70 picks up the signal from the primary stator winding 72 and feeds it to an amplifier 76. The output of the amplifier 76 drives a synchro motor 77, which drives a shaft 78. A rotor shaft 80 carrying the coil 75 is driven by the shaft 78 via a mechanical gear box 81 to a null position. The shaft 80 is preferably rotated 36 degrees per hundred knots of true air speed the same as the shaft 78. However, a rotor shaft 82 carrying a secondary winding 83 of a linear transformer 84 is driven by the shaft 78 via the gear box 81 preferably at the rate of ten degrees per hundred knots of true air speed.

Since the secondary winding 83 of the linear transformer 84 is connected back-to-back to the rotor coil 65 of the resolver 64 the TAS signal picked up by the transformer 84 is transmitted to the resolver 64. The transformer 84 has a stator primary winding 85 energized by a rated electrical power supply.

The signal picked off by the coil 62 is proportional to the vertical speed of the aircraft obtained from a fine altitude synchro system comprised of a transmitter 90 and a control transformer 91. Y-shaped secondary and primary windings 92, 93 of the transmitter 90 and the transformer 91, respectively, are connected back-to-back for transmitting a signal indicative of fine altitude change such as that sensed by an altitude sensing and indicating system disclosed in copending U.S. Patent application entitled "Barometric-Radar Altitude Indicating System" of Stephen J. Sikora, Serial No. 861,155. For example, a shaft 94, which is angularly adjusted proportional to the altitude change, positions an input rotor coil 95 relative to the secondary winding 92.

The rotor coil 95 is connected to a rated electrical power supply. A rotor or secondary winding 96 picks up the signal and drives a synchro motor 97 via an amplifier 98. The motor drives an electrical generator 99 to generate an electrical signal proportional to the rate of vertical altitude change H, which is picked off by the coil 62 shown here as a separate coil but which is normally part of generator 99. The generator 99 is driven by the synchro motor 97 until the winding 96 is repositioned via a shaft 200 preferably at the rate of ten revolutions per minute and causes the output of the amplifier 98 to be nulled. This motor-generator arrangement may be referred to as a tachometric follow-up of altitude.

It will be understood that true horizontal speed can be obtained from the resolver 64, which is a sine-cosine resolver, by providing a servo loop having a cosine stator winding 201 picking off an electrical signal and driving a synchro motor 202 via an amplifier 203 in the horizontal speed servo loop. A pointer 204 of an indicator 205 is then driven by an output shaft 206 of the motor 202 via a suitable gear train. The output of the amplifier 203 is nulled by a signal picked up in a coil 207 of a control synchro 208 having a rotor shaft 209 which is normally fixed but which may be rotated for adjusting the coil 207 which is oppositely wound relative to the other pickoff coil 201 in the horizontal speed servo loop. The motor shaft 206 drives a rotor coil 210 of a linear transformer 211 having a primary winding 212 connected to a rated power supply. The secondary 210 is connected to a primary or stator winding 213 of the control synchro 208. The shaft 206 is driven at the rate of ten degrees per hundred knots.

The true vertical speed of the aircraft is indicated by a rate of climb indicator 220 having a pointer driven by a synchro motor 222 via a drive shaft arrangement 223 and a gear box located in the indicator 220, similar to the horizontal speed indicator arrangement. However, an additional sine-cosine resolver 225 must be provided for picking off a signal indicative of the vertical speed of the aircraft. A rotor coil 226 is driven by the shaft 18. A sine coil 227 picks off the vertical speed H and drives the motor 222 via an amplifier 228. The motor shaft 223 nulls amplifier output via a linear transformer 230 and a control synchro 231 having a rotor output coil 232 in the servo loop of the amplifier 228. The coil 232 is wound oppositely to the sine coil 227 of the resolver 225. The linear transformer 230 has an energized primary winding 233 and a rotor or secondary coil 234 connected to a stator winding 235 of the control synchro 231. A rotor shaft 236 of the rotor coil 232 is fixed, but adjustable for calibration purposes.

The rotor winding 226 of the resolver 225 is provided with a signal from a secondary winding 237 of a linear transformer 238 driven by the TAS rotor shaft 82. The transformer 238 has a primary winding 239 connected to a standard power supply.

From the foregoing it is apparent that not only is angle of attack indicated, but also vertical and horizontal speeds can be computed and indicated. If desired, a suitable servo loop can be connected to the cosine winding 240 of the resolver 225 in lieu of the using of the cosine winding 201 of the resolver 64, as described.

Suitable transducers can be connetced to any of the shafts to obtain electrical information from the data indicated by the position or rotation of the shafts. For example, a transducer 250, comprising a suitably energized potentiometer resistor 251 and a wiper 252 driven by the angle of attack shaft 11, may pick off an electrical signal indicative of the aircraft angle of attack. A gear train 253 is used to obtain a suitable gear ratio. The potentiometer may be a control transformer or synchro wherein the wiper 252 rotates relative to the resistance 251.

It will be understood that the present invention may be modified to adapt it to various circumstances and conditions, and it is accordingly desired to comprehend within the purview of this invention such modifications as may be considered to fall within the scope of the appended claims.

What is claimed, is:

1. An angle of attack computer for an aircraft comprising, means sensing the roll of the aircraft from a fiduciary attitude thereof and generating a roll signal proportional thereto, means sensing the pitch of the aircraft from the fiduciary attitude thereof and generating a pitch signal proportional thereto, first null-seeking servo motor means driven by said roll signal, second null-seeking servo motor means driven by said pitch signal, third-null-seeking servo motor means having a closed servo loop input, cosine resolver means for generating a signal proportional to the cosine of said roll signal, first linear transformer means having a primary winding connected to said casine resolver and a secondary winding in said servo loop having a signal induced therein proportional to the cosine of said roll signal, first shaft means providing an output proportional to earth angle of attack, second linear transformer means having an energized primary winding and a secondary winding in said servo loop wound in opposition to said secondary winding of said first linear transformer, means connected to said first shaft means for rotating said secondary winding of said second linear transformer an amount proportional to said earth angle of attack said secondary winding of said second linear transformer providing a signal proportional to said earth angle of attack, differential means driving said third servo motor means an amount proportional to the difference between the signal in said secondary windings of said first and second linear transformers, second shaft means driven by said third servo motor means, and indicator means driven by said second shaft means for indicating angle of attack, and said secondary winding of said first linear transformer driven by said second shaft means until the output of said third servo motor means is nulled and the angular position of said shaft means is indicative of the true angle of attack of the aircraft.

2. An angle of attack computer as set forth in claim 1, further comprising, mechanical means for generating a signal proportional to the instantaneous flight path angle of the aircraft, and means for generating a signal proportional to the difference between said flight path angle signal and said pitch angle signal and angularly adjusting said second linear transformer accordingly.

3. An angle of attack computer as set forth in claim 2, further comprising, fourth null-seeking servo motor means having an output shaft and servo loop input means connected thereto, means for generating a signal proportional to the instantaneous vertical speed of the aircraft and inducing the same into said input means, and means including first resolver means having a rotor for generating a signal proportional to the product of the instantaneous true airspeed of the aircraft and a sine of the flight path angle of the aircraft and inducing the same into said input means in opposition to said vertical speed signal, said fourth servo motor means driving said output shaft and the rotor of said first resolver means until said true airspeed signal and said product signal are equal and the output of said fourth servo motor means is nulled, and the angular position of said output shaft being indicative of the flight path angle of the aircraft when said fourth servo motor means is nulled.

4. An angle of attack computer as set forth in claim 3, wherein said vertical speed signal generating means comprises, altitude sensing means for continually generating a signal indicative of altitude, a synchro system for transmitting said altitude signal, fifth null-seeking servo motor means having a servo loop with a coil adapted to pick off said altitude signal and drive said fifth servo motor means, and tachometric follow-up means comprising a generator driven by said fifth servo motor means for generating said vertical speed signal.

5. An angle of attack computer as set forth in claim 3, wherein said product signal generating means comprises, true airspeed signal generating means, third shaft means driven by said true air-speed signal generating means, said first resolver means of said product signal generating means having a rotor coil on said rotor connected to said third shaft means and rotated an amount proportional to said true airspeed signal, and said first resolver means of said product signal generating means also having a sine coil in said input means adapted to pick off said product signal.

6. An analog computer as set forth in claim 5, wherein said resolver means of said product signal generating means has a cosine coil, sixth null-seeking servo motor means connected to said cosine coil for being driven by the signal induced therein proportional to the horizontal speed of the aircraft, and fourth shaft means driven by said sixth servo motor means adapted to be angularly positioned indicative of the horizontal speed of the aircraft, and horizontal speed indicator means driven by said fourth shaft means.

7. An analog computer as set forth in claim 5, further comprising, additional resolver means having a rotor coil adapted to be energized by said true airspeed signal and angularly positioned by said output shaft of said fourth servo motor means, said additional resolver means having a sine coil picking off a signal proportional to the vertical speed of the aircraft, seventh null-seeking servo motor means adapted to be energized by said vertical speed signal and driving an output shaft, and indicator means driven by said output shaft of said seventh servo motor means for indicating the vertical speed of the aircraft.

8. An angle of attack computer for an aircraft comprising, means sensing the roll of the aircraft from a fiduciary attitude thereof and generating a roll signal proportional thereto, first servo motor means driven by said roll signal, second servo motor means having closed servo loop input, cosine resolver means for generating a signal proportional to the cosine of said roll signal, first transformer means having a primary winding connected to said resolver for picking off said cosine roll signal and a secondary winding in said servo loop for having a signal induced therein proportional to the cosine of said roll signal, means for generating a signal proportional to earth angle of attack, second transformer means having an energized primary winding and a secondary winding in said servo loop wound in opposition to said secondary winding of said first transformer means, means for shifting said secondary winding of said first transformer means relative to the primary winding thereof by an amount proportional to said earth angle of attack, the difference between the signals in said secondary windings of said first and second transformers driving said second servo motor means, and shaft means driven by said second servo motor means, and said secondary winding of said first transformer means being angularly positioned by said shaft means until the output of said second servo motor means is nulled and the angular position of said shaft means is indicative of the true angle of attack of the aircraft.

9. An angle of attack computer as set forth in claim 8, further comprising a mechanical differential means having a first and second input shafts and an output shaft, means for angularly positioning said first shaft proportional to the instantaneous flight path angle of the aircraft, and means for angularly positioning a second shaft proportional to the pitch angle of the aircraft, and said output shaft being angularly positioned proportional to the difference between said flight path angle signal and said pitch angle signal and angularly adjusting said secondary winding of said second transformer means accordingly.

10. An angle of attack computer as set forth in claim 9, further comprising, third servo motor means having an output shaft and servo loop input means connected thereto, means for generating a signal proportional to the instantaneous vertical speed of the aircraft and inducing the same into said input means, means including resolver means having a rotor for generating a signal proportional to the product of the instantaneous true airspeed of the aircraft and the sine of the flight path angle of the aircraft and inducing the same into said input means in opposition to said vertical speed signal, said third servo motor means driving its output shaft and the rotor of said resolver means of said product signal generating means until said vertical speed signal and said product signal are equal and the output of said third servo motor means is nulled, and said output shaft of said third servo motor means being angularly positioned indicative of the flight path angle of the aircraft.

11. An angle of attack computer as set forth in claim 10, wherein said vertical speed signal generating means comprises, altitude sensing means for continually generating a signal indicative of altitude, a synchro system coupled to said altitude sensing means for transmitting said altitude signal, fourth servo motor means having a servo loop with a coil adapted to pick off said altitude signal and drive said fourth servo motor means, and tachometric follow-up means comprising a generator driven by said fourth servo motor means for generating said vertical speed signal.

12. An angle of attack computer as set forth in claim 11, wherein said product signal generating means comprises, true airspeed signal generating means, and means for transmitting said true airspeed signal, said resolver means of said product signal generating means having a rotor coil on said rotor connected to said transmitting means and energized by said true airspeed signal, and said resolver means of said product signal generating means having a sine coil in said input means adapted to pick off said product signal.

13. In an instrument panel for an aircraft, angle of attack indicator means, first means providing an output proportional to true airspeed TAS of the aircraft, second means providing an output proportional to vertical velocity H of the aircraft, first computer means connected to said first and second means computing the angle whose sine is the quotient $$\frac{H}{TAS}$$

of said vertical velocity output H and said true airspeed output TAS to provide an output proportional to the flight path angle $\gamma$ of the aircraft, third means providing an output proportional to the pitch angle $\theta$ of the aircraft, differential means connected to said third means and said first computer means subtracting said flight path angle output $\gamma$ from said pitch output $\theta$ to provide an output proportional to the angle of the attack $\alpha_E$ of the aircraft relative to earth coordinates, fourth means providing an output proportional to the roll angle $\phi$ of the aircraft, second computer means connected to said differential means and said fourth means multiplying said angle of attack $\alpha_E$ relative to earth coordinates by the reciprocal of the cosine of said roll output $$\frac{1}{\cos \phi}$$

to provide an output proportional to the angle of attack $\alpha$ of the aircraft relative to aircraft coordinates, fifth means connecting said second computer means to said indicator means whereby said indicator means provides a display of the angle of attack $\alpha$ of the aircraft relative to aircraft coordinates.

References Cited in the file of this patent

UNITED STATES PATENTS

| 2,714,309 | Redemske | Aug. 2, 1955 |
| 2,761,315 | Anderson et al. | Sept. 4, 1956 |
| 2,855,779 | Zaid | Oct. 14, 1958 |
| 2,896,145 | Snodgrass | July 21, 1959 |